United States Patent
Hayduk

(10) Patent No.: US 7,636,371 B2
(45) Date of Patent: Dec. 22, 2009

(54) COMMUNICATION SUBSYSTEM FOR WIRELESS DEVICES OR THE LIKE

(75) Inventor: Matthew A. Hayduk, Calgary (CA)

(73) Assignee: Intel Corporation, Santa Clara, CA (US)

( * ) Notice: Subject to any disclaimer, the term of this patent is extended or adjusted under 35 U.S.C. 154(b) by 1104 days.

(21) Appl. No.: 10/330,840

(22) Filed: Dec. 27, 2002

(65) Prior Publication Data

US 2004/0125758 A1 Jul. 1, 2004

(51) Int. Cl.
*H04L 12/66* (2006.01)
*H04L 12/28* (2006.01)
*H04J 3/16* (2006.01)

(52) U.S. Cl. .................... 370/463; 370/419; 370/469
(58) Field of Classification Search .............. None
See application file for complete search history.

(56) References Cited

U.S. PATENT DOCUMENTS

| | | | | |
|---|---|---|---|---|
| 5,946,634 A * | 8/1999 | Korpela | ............. | 455/552.1 |
| 6,122,514 A * | 9/2000 | Spaur et al. | ............. | 455/448 |
| 6,137,802 A * | 10/2000 | Jones et al. | ............. | 370/401 |
| 6,526,034 B1 * | 2/2003 | Gorsuch | ............. | 370/338 |
| 6,801,786 B1 * | 10/2004 | Korpela | ............. | 455/552.1 |
| 6,996,076 B1 * | 2/2006 | Forbes et al. | ............. | 370/310 |
| 7,072,329 B2 * | 7/2006 | Willars et al. | ............. | 370/352 |
| 7,133,669 B2 * | 11/2006 | Nair et al. | ............. | 455/432.1 |
| 7,295,532 B2 * | 11/2007 | Haller et al. | ............. | 370/328 |
| 7,492,787 B2 * | 2/2009 | Ji et al. | ............. | 370/466 |
| 2002/0147008 A1 * | 10/2002 | Kallio | ............. | 455/426 |
| 2003/0081547 A1 * | 5/2003 | Ho | ............. | 370/229 |
| 2003/0112790 A1 * | 6/2003 | Hayduk et al. | ............. | 370/349 |
| 2003/0185233 A1 * | 10/2003 | Ji et al. | ............. | 370/466 |
| 2004/0100923 A1 * | 5/2004 | Yam | ............. | 370/328 |

* cited by examiner

*Primary Examiner*—Chi H Pham
*Assistant Examiner*—Warner Wong
(74) *Attorney, Agent, or Firm*—Schwegman, Lundberg & Woessner, P.A.

(57) ABSTRACT

Briefly, in accordance with one embodiment of the invention, a wireless terminal may include an application subsystem and a communication subsystem. The communication subsystem in one embodiment may enable a virtual direct interface to a remote network to be presented to the application subsystem via a wireless communication system air link interface. The communication subsystem may allow applications of the application subsystem to be independent of any particular radio technology or network implementation of a wireless communication system air link interface. Once a session is established between the communication subsystem and the wireless communication system air link interface, the application subsystem may gain access to the remote network through the communication subsystem via a transport interface.

16 Claims, 4 Drawing Sheets

COMMUNICATION SUBSYSTEM FOR WIRELESS DEVICES OR THE LIKE

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
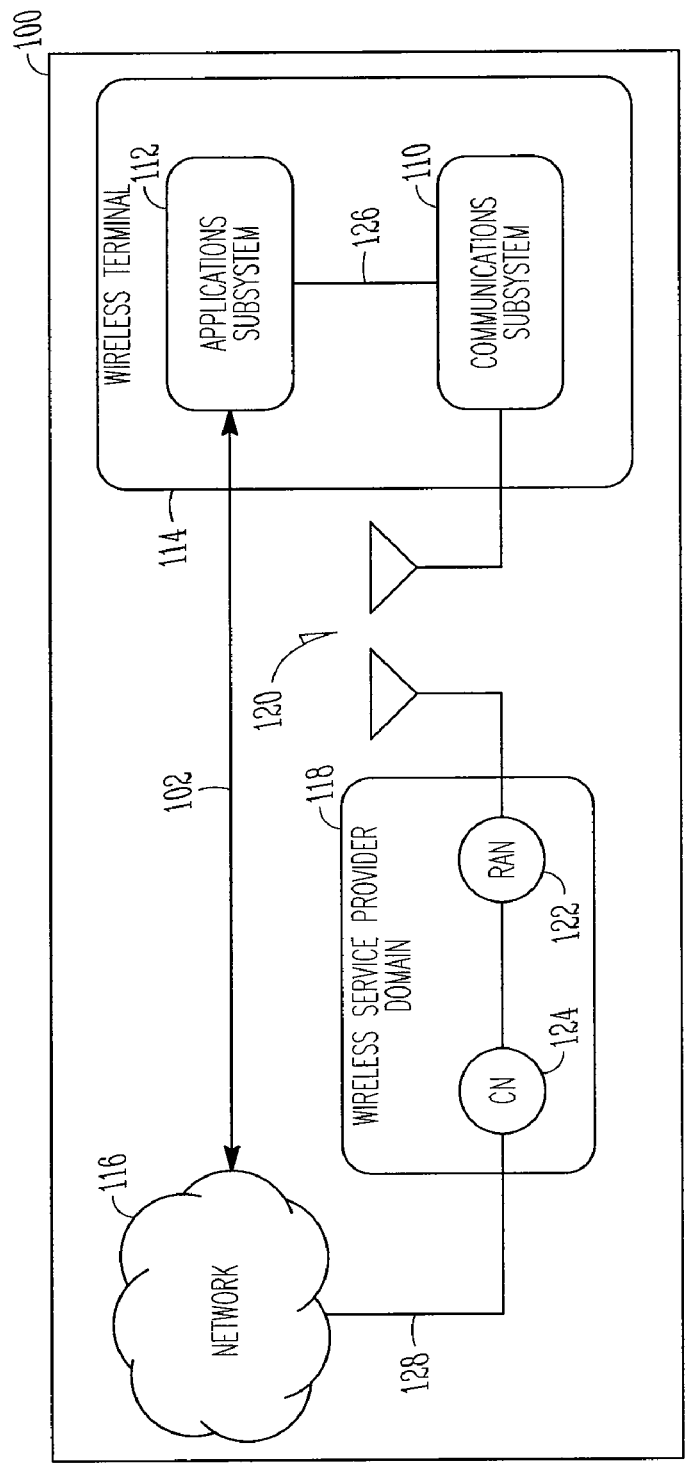
FIG. 1 is a block diagram of a wireless communication system in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA2000, and the like.

Referring now to FIG. 1, a system in accordance with one embodiment of the present invention will be discussed. In the communication system 100 shown in FIG. 1, a communication subsystem 110 and an application subsystem 112 may be included in a wireless terminal 114. Communication subsystem 110 may enable a virtual direct interface 102 to network 116, which may include, for example, one or more public mobile networks or one or more land networks, such as the Internet, to be presented to application subsystem 112. Alternatively, network 116 may also be a private network or an intranet. Application subsystem 112 may include one or more applications to run on wireless terminal 114. As shown in FIG. 1, communication subsystem 110 may manage access of application subsystem 112 to network 116 via wireless link 120 to wireless service provider 118. Once a session is established between communication subsystem 110 and wireless service provider 118, application subsystem 112 may gain access to functions provided by network 116 through wireless service provider 118 over wireless link 120.

In one embodiment of the invention, communication subsystem 110 may allow application of application subsystem 112 to be independent of any particular radio technology or any network implementation of wireless service provider 118 by encapsulating wireless communication that have access to public network 116 and providing wireless services to application subsystem 112. Such a result may be accomplished where communication subsystem 110 may include wireless communication protocol software and associated protocol services as may be needed to access and support a desired network such as a wireless wide area network (WWAN), for example a cellular or mobile telephone network, a personal area network (PAN), for example implementing a network in accordance with a Bluetooth standard, for example the Bluetooth 1.0 specification promulgated by the Bluetooth Special Interest Group, or a wireless local area network (WLAN), although the scope of the invention is not limited in this respect.

In one embodiment of the invention, communication subsystem 110 may present wireless communication services to application subsystem 112 through identified interfaces that abstract the services across one or more wireless protocols. Communication subsystem 110 may present such services independent of any platform or wireless technology used to deliver the services. For example, in accordance with a standard known as the Third Generation Partnership Project (3GPP), such a communication platform may be referred to as the Radio Access Network (RAN) 122 of wireless service provider 118 for wireless communication, or the intermediate Core Network (CN) 124 used by the wireless service provider 118 to access public network 116 via communication link 128.

Figure 2:
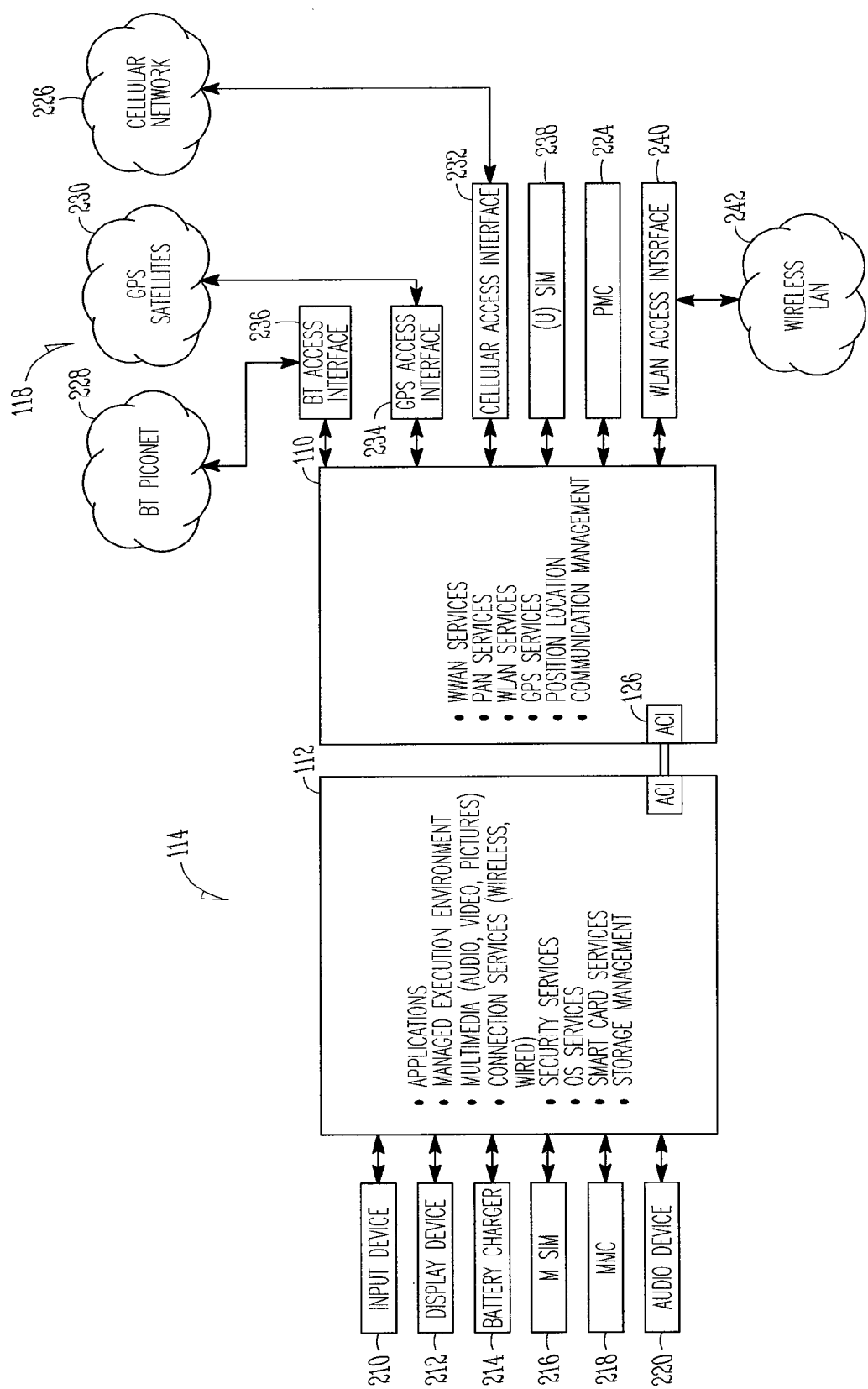
FIG. 2 is a block diagram of a wireless terminal that includes an application subsystem and a communication subsystem in accordance with one embodiment of the present invention.

Referring now to FIG. 2, a block diagram of wireless terminal in accordance with one embodiment of the present invention will be discussed. As shown in FIG. 2, the functions of wireless terminal 114 may be divided between application subsystem 112 and communication subsystem 110. Wireless terminal 114 may be, for example, a hand-held device such as a cellular telephone or a personal digital assistant (PDA) capable of communicating wirelessly with network 116, although the scope of the invention is not limited in this respect. Application subsystem 112 may be responsible for managing one or more applications running on wireless terminal 114, for example, providing a managed execution environment for running applications making use of multimedia services such as audio, video, and pictures, managing connection services including wireless connection services such as Bluetooth (BT) services or wireless local area network (WLAN), and including wired connection services such as universal serial bus (USB) services, security services, operating system (OS) services, smart card services, and storage management, although the scope of the invention is not limited in this respect.

Furthermore, application subsystem 112 may handle input and output from and to wireless terminal 114 from one or more peripheral devices or systems, including but not limited to an input device 210 such as a keypad, a display device 212 such as a liquid crystal display (LCD) or touch screen, battery charger 214, subscriber identity module (M-SIM) 216, multimedia card (MMC) 218, and an audio device 220 which may include one or more audio coder/decoders (CODECS), audio accessories such as a car kit, head set, high fidelity (Hi-Fi) sounds and ringer, and/or microphone input and speaker output, although the scope of the invention is not limited in this respect.

Communication subsystem 110 may be responsible for handling network communication services such as cellular telephone services, wireless wide area network (WWAN) services, personal area network (PAN) services, Bluetooth services, wireless local area network (WLAN) services, global positioning system (GPS) services, position location services, and communication subsystem management, although the scope of the invention is not limited in this respect. Application subsystem 112 and communication subsystem 110 may communicate via an application communication interface 126. In one embodiment of the invention, communication subsystems 110 manages communication with one or more wireless service providers 118 or the like, which may be embodied as cellular network 226 via cellular access interface 232, a Bluetooth (BT) piconetwork 228 via BT access interface 236, a network or constellation of global positioning system (GPS) satellites 230 via GPS interface 234, universal subscriber identity module U(SIM) 238, power management controller (PMC) 224, and a wireless local area network (WLAN) 242 via WLAN access interface 240, for example, a network compliant with a an Institute of Electrical and Electronics Engineers (IEEE) standard such as IEEE 802.11a, IEEE 802.11b, and so on, although the scope of the invention is not limited in this respect. The access interface for the communication services may include the physical interface point to core network (CN 124) wireless technology of FIG. 1.

Figure 3:
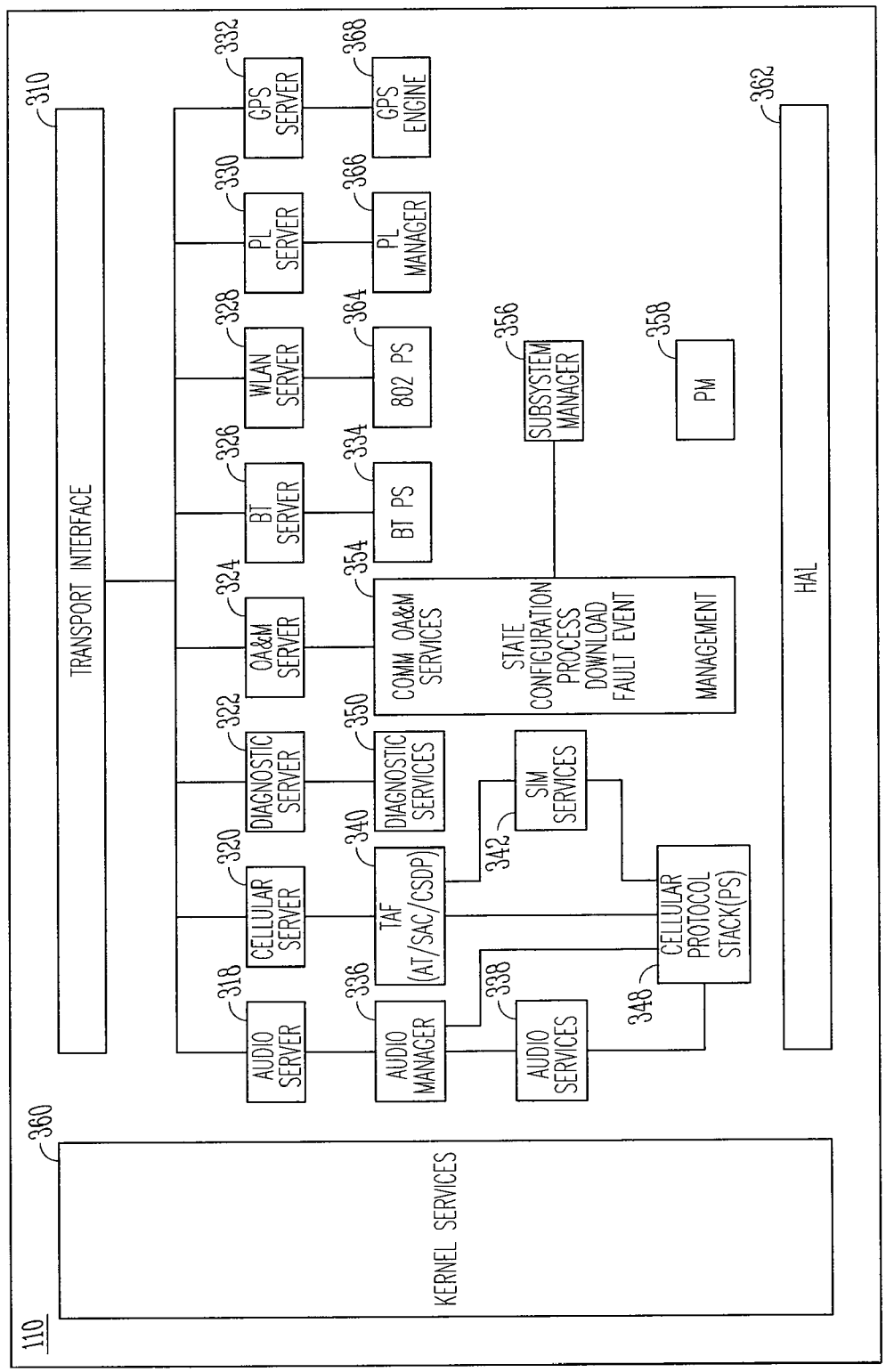
FIG. 3 is a block diagram of a communication subsystem in accordance with one embodiment of the present invention.

Referring now to FIG. 3, a block diagram of a communication subsystem in accordance with an embodiment of the invention will be discussed. Communication subsystem 110 may include a transport interface block 310, which may be utilized to allow services to be physically located anywhere in wireless terminal 114 while maintaining a unified logical interface to application subsystem 112. Transport interface block 310 may contain a service access layer to allow services to be discovered by the components of application subsystem 112 and to support the connection and transfer of data across the user and provider of a service. Transport interface block 310 may be realized through different physical links across processor boundaries or on a single physical processor using memory and inter-process communication mechanisms. The architecture of communication subsystem 110 may use any combination of physical interconnects available through transport interface block 310.

Transport interface block 310 may interface with one or more servers, which may include an audio server 318, cellular server 320, diagnostic server 322, operations, administration, and maintenance (OA&M) server 324, Bluetooth (BT) server 326 coupled with BT protocol stack (PS) 334, WLAN server 328 coupled with WLAN protocol stack (PS) 364, position location (PL) server 330 coupled with position location (PL) 366, and GPS server 332 coupled with GPS engine 368, although the scope of the invention is not limited in this respect. The servers supporting these interfaces may provide a consistent functional interface over the physical interconnect abstraction to achieve the independence of communication subsystem 110 and application subsystem 112 while maintaining the service interface of the communication components therein. In addition, transport interface block 310 may manage varying levels of service and bandwidth requirements for requested services.

Audio server 318 may communicate with audio manager 336 to relay requests and send audio information and data to and from application subsystem 112. Audio manager 336 may support interface requests from application subsystem 112 and other blocks of communication subsystem 110 such as terminal adaptation function block 340 or cellular protocol stack 348 to combine audio control across one or more components within wireless terminal 114. Audio services block 338, which may communicate with cellular protocol stack 344, may process one or more audio control requests and may perform audio processing functions which may include core network (CN) 124 coding and decoding, echo cancellation, and other audio control path functions.

Cellular server 320 may communicate with terminal adaptation function (TAF) block 340 which may provide an abstraction of the cellular AT command set, service access controller (SAC) support, and circuit switched data protocols (CSDP) support. TAF block 340 may also communicate with audio manager 336 to establish and control circuit switched voice paths. TAF block 340 may also communicate with subscriber identity module (SIM) services block 342 to obtain subscriber identity and subscribed network control information used to maintain access to core network (CN) 124. TAF block 340 may also translate the functional interface of cellular server 320 into interface calls of cellular protocol stack 348. Such translation may allow the interface of cellular server 320 to be adapted to cellular protocol stacks of different technologies of different core networks (CN) 124. Cellular protocol stack 348 may provide cellular protocol functionality for a given air link standard such as the Global System for Mobile Communication (GSM) or Universal Mobile Telecommunications System (UMTS), although the scope of the invention is not limited in this respect.

Diagnostic server 322 may communicate with diagnostic services 350 which may interact with the other blocks of communication subsystem 110 to allow lower-level access to control block subfunctions for the purpose of system diagnosis. Such an arrangement may allow a user of wireless terminal 114 to enable diagnosis of communication system 100 to a component subfunction through application subsystem 112 via transport interface 310 and diagnostic server 322. Diagnostic services block 350 may be responsible to manage, coordinate, gather, and report information through diagnostic server 322 to application subsystem 112 and a user of wireless terminal 114.

OA&M server 324 may communicate with communication OA&M services block 354, which in turn may communicate with subsystem manager 356. Subsystem manager 356 may provide autonomous control within communication subsystem 110 based on one or more configuration profiles. Such an arrangement may allow subsystem manager 356 to bring communication subsystem 110 up or disable it under predetermined conditions, which may allow subsystems manager 356 to interact with components of communication subsystem 110 as may be needed. Subsystem manager 356 may interact with communication OA&M services block 354 to establish a behavior policy for communication OA&M services block 354 and to notify communication OA&M services block 354 of actions taken. Communication OA&M services block 354 may manage overall OA&M transactions taken within communication subsystem 110, which may include state management, testing, configuration, downloads of new software, fault management, and event management, although the scope of the invention is not limited in this respect. Requests to and responses from application subsystem 112 may be provided by the functional interface of OA&M server 324 and the physical interface abstraction of transport interface block 310.

Bluetooth (BT) server 326 may communicate with BT protocol stack (PS) block 334 to provide application subsystem 112 with access to Bluetooth core network (CN) 124 technology. Similarly, WLAN server 328 may communicate with WLAN protocol stack (PS) 364 to provide application subsystem 112 with access to WLAN core network (CN) 124 technology. GPS server 332 may communicate with GPS engine 368 to provide global positioning system services to application subsystem 112. Position location (PL) server 330 may communicate with position location manager 366 to provide enhanced location information to application subsystem 112. Such enhanced location information may be provided by combining position location information from other components providing such information, including cellular protocol stack 348, BT protocol stack (PS) 334, and GPS server 332 into a single position location update. Position location server 330 may provide functional access to such a combined position location update, although the scope of the invention is not limited in this respect.

A kernel services block 360 may be provided in communication subsystem 110, along with hardware abstraction layer (HAL) block 362 and power manager 358. Together, kernel services block 360 and HAL block 362 may provide control of the hardware and peripherals of communication subsystem 110 to effectively manage the state and operational behavior in a predictable manner. Other blocks of communication subsystem 110 may interact with kernel services block 360 and HAL block 362 as needed under the direction of wireless terminal 114 via application subsystem 112 and transport interface block 310, although the scope of the invention is not limited in this respect.

Wireless communication subsystems 110 as shown in FIG. 3 may provide an implementation independent, wireless technology specific, access service within different private and public networks 116 of communication system 100. In a cellular domain, for example, additional complexity to manage the multiplicity of cellular technology solutions available and to maintain a larger degree of independence across differing cellular technologies may be provided. In one embodiment of the invention, Service Access Controller (SAC) functions of TAF block 340 may provide a consistent programming interface through a cellular server 320 to manage the independence of application subsystem 112 and communication subsystem 110. In addition to the wireless components, common services such as audio, diagnostics, and management may be identified with the services to exercise them, and exported to application subsystem 112. Such an arrangement may provide communication subsystem 110 with a predetermined degree of autonomy. The component isolation and transport interface block 310 may allow varying implementations to be implemented underneath and not impact application subsystem 110. Isolating the wireless communication components in communication subsystem 110 from application subsystem 112 may allow a hardware level physical mapping to the software architecture of communication system 100 and may provide a higher degree of system integration, although the scope of the invention is not limited in this respect.

Figure 4:
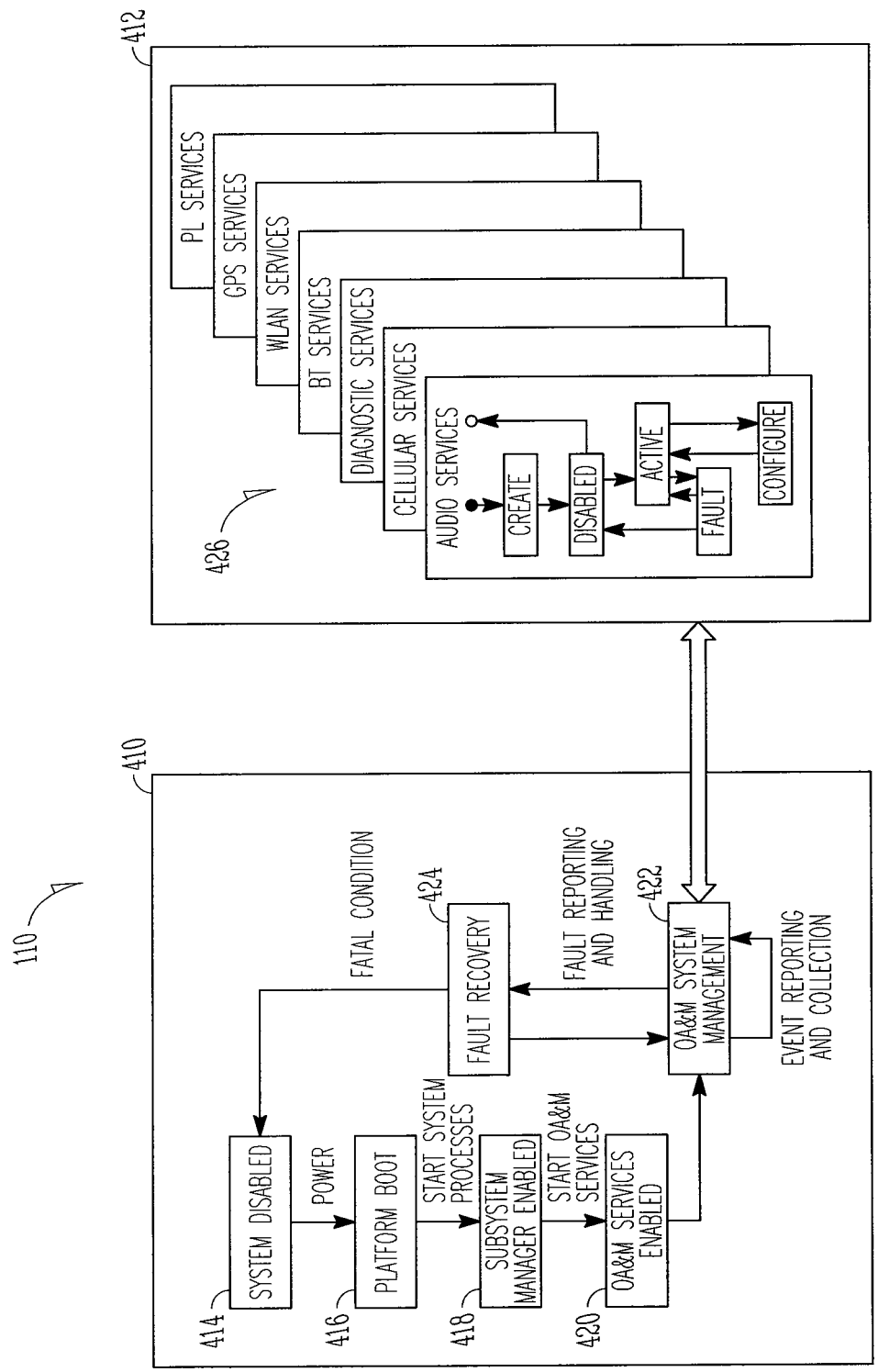
FIG. 4 is a flow diagram of an aspect of operation of a communication subsystem in accordance with an embodiment of the present invention.

Referring now to FIG. 4, a flow diagram of an aspect of the operation of a communication subsystem in accordance with an embodiment of the present invention will be discussed. Communication subsystem management block 410 may control the overall communication system 100. Communication subsystem management block 410 may also be responsible for the overall control of each of the managed objects 426 inside communication subsystem managed objects block 412 for the life of the objects 426, although the scope of the invention is not limited in this respect.

When wireless terminal 114 is turned on, communication subsystem 110 may be in a disabled system state 414. As power is applied to communication subsystem 110, communication subsystem 110 may enter a platform boot state 416 where devices connected in HAL block 362 may be initialized. Subsequently, kernel services 360 may be started. After devices connected to HAL block 362 are initialized and after kernel services 360 are started, start system processes may be initiated to transition to a subsystem manager enabled state 418 at which point tasks may be started to enable system manager 356 at block 420. At this point subsystem manager 356 may take autonomous action to establish a state of communication subsystem 110 that may include at least OA&M services. At this point communication subsystem 110 may enable transport interface block 310 to enable communication with application subsystem 112 and OA&M server 324 as well as to start communication OA&M services 354. At least partial or full OA&M service may be enabled within wireless terminal 114 at this point. Management of communication subsystem 110 may then transfer to OA&M system management block 422 where normal operation may occur. One or more or all OA&M requests received through OA&M server 324 may be received and acted upon. Typically, such requests may be directed toward an appropriate managed object 426 with event and fault policies being enforced at a system level. One or more or all fault reporting and handling events may be profiled and collected for detailed fault analysis within the fault recovery mechanism at block 424. A fatal condition may halt the system and return it to system disabled state 414. Faults that are capable of being handled may allow operation to continue in OA&M system management block 422.

Within communication subsystem managed objects block 412, available services may be identified as a managed object 426 that wireless terminal 114 is capable of controlling. Each service may have a higher-level set of states that may be common across objects 426. Within the active state each service may provide additional sub states allowing finer control by application subsystem 112 of that component. Once a managed object is active, that service may have tasks started to enable the server for that server as well as functional service blocks as needed. For example, for audio there are audio server, audio manger, and audio services. Application subsystem 112 may then make use of its services by discovering the service over the transport interface 310 and then using the functional interface it provides into the available services.

Although the invention has been described with a certain degree of particularity, it should be recognized that elements thereof may be altered by persons skilled in the art without departing from the spirit and scope of the invention. It is believed that the communication subsystem for wireless devices or the like of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
a communication subsystem to couple an application subsystem to a network via a wireless air link interface, wherein the application subsystem is to include a plurality of applications that are independent of any wireless technology; and
said communication subsystem including:
at least one or more servers to provide network communication services to the application subsystem; and
a transport interface coupled between the application subsystem and the servers to provide a physical interconnect abstraction to the wireless protocol and services of the wireless air link interface, said transport interface to transfer information between a wireless protocol of the wireless air link interface and an application of the application subsystem, wherein said transport interface includes a service access layer configured to cause the services to be discoverable by the application and to provide a consistent interface between the application and the network communication services that is independent of any wireless technology used to provide the services.

2. An apparatus as claimed in claim 1, wherein said transport interface is adapted to manage service level and bandwidth for requested network services.

3. An apparatus as claimed in claim 1, wherein said communication subsystem is adapted to present wireless communication services to the application subsystem via said transport interface independent of at least one or more of a hardware system and kernel.

4. An apparatus as claimed in claim 1, wherein said communication subsystem is adapted to present wireless communication services to the application subsystem via said transport interface independent of a radio access network of the wireless air link interface.

5. An apparatus as claimed in claim 1, wherein said communication subsystem is adapted to present network services to the application subsystem via said transport interface independent of an intermediate network used by the wireless air link interface to access a core network.

6. An apparatus as claimed in claim 1, wherein said communication subsystem is adapted to present wireless communication services to the application subsystem via said transport interface independent of a radio access network of the wireless air link interface.

7. An apparatus, comprising:
an application subsystem to include a plurality of applications that are independent of any wireless technology;
a communication subsystem including at least one or more servers coupled to a transport interface to provide a physical interconnect abstraction to the wireless protocol and services of the wireless air link interface;
a transport interface to couple said application subsystem with said communication subsystem wherein said transport interface includes a service access layer configured to cause services to be discoverable by an application of the application subsystem and to provide a consistent interface between the application and the network communication services that is independent of any wireless technology used to provide the services.

8. An apparatus as claimed in claim 7, wherein said at least one or more servers include at least one of a personal area network server, a piconet server, a wireless wide area network server, a wireless local area network server, a global positioning system server, a position location server, a cellular server, an audio server, a diagnostic server, and an operations, administration, and maintenance server.

9. An apparatus as claimed in claim 7, wherein said at least one or more servers is capable of communicating simultaneously with a remote network.

10. An apparatus as claimed in claim 7, further comprising a subsystem manager to manage independent operation of said at least one or more servers.

11. An apparatus, comprising:
a radio-frequency transceiver to couple to a microstrip antenna;
an application subsystem to include a plurality of applications that are independent of any wireless technology;
a communication subsystem to couple the application subsystem to a network via a wireless air link interface, said communication subsystem further comprising at least one or more servers coupled to a transport interface, said transport interface coupled between the application subsystem and the servers to provide a physical interconnect abstraction to the wireless protocol and services of the wireless air link interface; and
said transport interface to transfer information between a wireless protocol of the wireless air link interface and an application of the application subsystem wherein said transport interface includes a service access layer configured to cause services to be discoverable by the application and between the application and the network communication services that is independent of any wireless technology used to provide the services.

12. An apparatus as claimed in claim 11, said transport interface further managing service level and bandwidth for requested network services.

13. An apparatus as claimed in claim 11, wherein said communication subsystem is adapted to present wireless communication services to the application subsystem via said transport interface independent of at least one or more of a hardware system and kernel.

14. An apparatus as claimed in claim 11, wherein said communication subsystem is adapted to present wireless communication services to the application subsystem via said transport interface independent of a radio access network of the wireless air link interface.

15. An apparatus as claimed in claim 11, wherein said communication subsystem is adapted to present network services to the application subsystem via said transport interface independent of an intermediate network used by the wireless air link interface to access a core network.

16. An apparatus as claimed in claim 11, wherein said communication subsystem is adapted to present wireless communication services to the application subsystem via said transport interface independent of a radio access network of the wireless air link interface.

* * * * *

UNITED STATES PATENT AND TRADEMARK OFFICE
CERTIFICATE OF CORRECTION

PATENT NO.        : 7,636,371 B2                                      Page 1 of 1
APPLICATION NO.   : 10/330840
DATED             : December 22, 2009
INVENTOR(S)       : Matthew A. Hayduk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1484 days.

Signed and Sealed this

Twenty-first Day of December, 2010

David J. Kappos
*Director of the United States Patent and Trademark Office*